United States Patent
Eckert

(10) Patent No.: US 7,360,977 B2
(45) Date of Patent: Apr. 22, 2008

(54) MACHINE TOOL GEAR MECHANISM

(75) Inventor: Harald Eckert, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/573,668

(22) PCT Filed: Sep. 29, 2004

(86) PCT No.: PCT/EP2004/010884

§ 371 (c)(1),
(2), (4) Date: Mar. 29, 2006

(87) PCT Pub. No.: WO2005/049265

PCT Pub. Date: Jun. 2, 2005

(65) Prior Publication Data
US 2006/0270518 A1    Nov. 30, 2006

(30) Foreign Application Priority Data

| Oct. 21, 2003 | (DE) | ................................. 103 48 755 |
| Oct. 21, 2003 | (DE) | ................................. 103 48 757 |
| Jan. 24, 2004 | (DE) | ..................... 10 2004 003 684 |
| Jan. 24, 2004 | (DE) | ..................... 10 2004 003 685 |

(51) Int. Cl.
*B23C 1/00* (2006.01)

(52) U.S. Cl. .................... 409/231; 409/233; 408/57; 408/234

(58) Field of Classification Search ................ 409/135, 409/136, 144, 230, 231, 232, 233; 408/234, 408/239 R, 57, 59, 124; 29/57, 64; 192/61, 192/105 F, 103 FA, 59, 60
See application file for complete search history.

(56) References Cited

U.S. PATENT DOCUMENTS

| 3,373,658 | A | * | 3/1968 | Larsen | ....................... 409/231 |
| 3,459,393 | A | * | 8/1969 | Thomas | ....................... 244/63 |
| 3,869,940 | A | * | 3/1975 | Webb et al. | .................. 192/61 |
| 3,926,287 | A | * | 12/1975 | Taylor | ........................ 192/61 |
| 4,167,218 | A | * | 9/1979 | Horiuchi et al. | ............ 409/233 |
| 4,248,332 | A | * | 2/1981 | Noyes | ........................ 192/61 |
| 4,322,988 | A | * | 4/1982 | Hill | ............................ 192/61 |
| 4,610,184 | A | * | 9/1986 | Taylor | ........................ 192/61 |
| 4,620,824 | A | | 11/1986 | Eckstein et al. | |
| 4,789,280 | A | * | 12/1988 | Dobat et al. | ................ 409/233 |
| 4,981,403 | A | * | 1/1991 | Katayama | ................... 409/136 |
| 4,997,325 | A | | 3/1991 | Heel et al. | |
| 6,000,513 | A | * | 12/1999 | Richards | ...................... 192/61 |
| 6,605,019 | B1 | | 8/2003 | Eckert | |

FOREIGN PATENT DOCUMENTS

| DE | 34 47 932 A1 | 9/1985 |
| WO | WO-00/63589 | 10/2000 |

* cited by examiner

*Primary Examiner*—Dana Ross
(74) *Attorney, Agent, or Firm*—Davis Bujold & Daniels, P.L.L.C.

(57) ABSTRACT

A machine tool transmission, in particular a spindle transmission, with which the force and/or the torque transfer from an output shaft (3) of a transmission (1) takes place directly on a spindle (15). The spindle (15) is placed co-axially over the output shaft (3). An integration of a sealed rotary feed-through is proposed to serve as a transfer device for the flow of cooling fluids, oil or air between the transmission output shaft and the spindle (15).

9 Claims, 1 Drawing Sheet

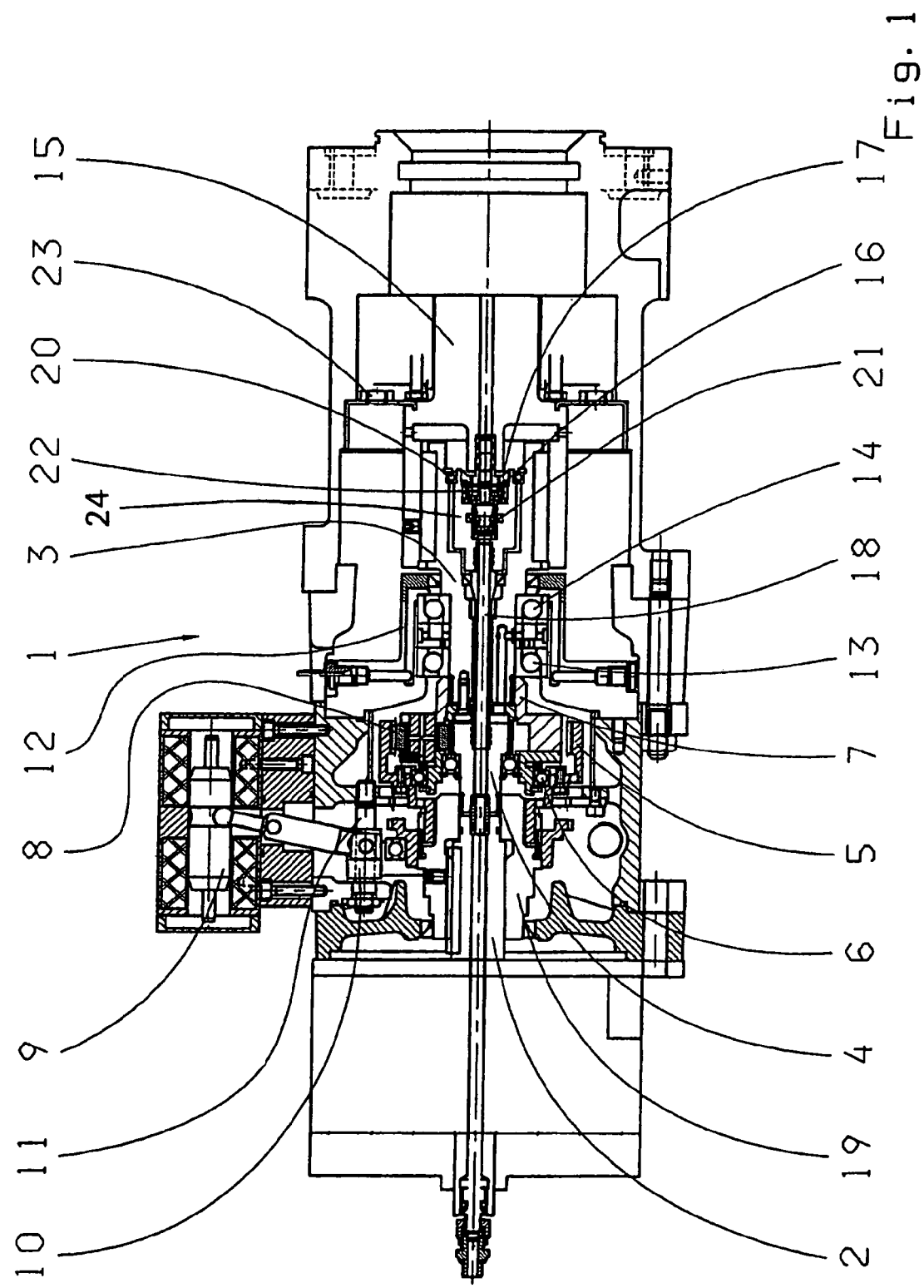

MACHINE TOOL GEAR MECHANISM

This application is a national stage completion of PCT/EP2004/010884 filed Sep. 29, 2004 which claims priority from German Application Serial Nos. 103 48 757.3 filed Oct. 21, 2003; 10 2004 003 684.5 filed Jan. 24, 2004; 103 48 755.7 filed Oct. 21, 2003 and 10 2004 003 685.3 filed Jan. 24, 2004.

FIELD OF THE INVENTION

The present invention concerns a machine tool transmission, specifically a special spindle transmission.

BACKGROUND OF THE INVENTION

The invention concerns a spindle transmission with which the strength and/or torque transfer from the output shaft of the transmission takes place directly on the spindle. The spindle is preferably placed in a co-axial arrangement with the output shaft. In the mentioned transmission, the output shaft is directly connected to the spindle. The torque proof connection, between the spindle and output shaft, can be carried out by positive fitting or by non-positive fitting. From this arises the necessity for a transferring device for cooling fluids, oils or air that flow between the transmission output and the spindle.

The described invention tackles this problem based on a machine tool transmission, in particular a spindle transmission of the kind specified initially, on which the placement of a device for the transfer of cooling fluids, oils or air between the transmission shaft and the spindle is intended.

SUMMARY OF THE INVENTION

Accordingly, a spindle transmission is proposed with which the force and/or torque transfer is carried out directly from the transmission output shaft to the spindle into which a sealed rotary feed-through is integrated, which serves as the device for transferring the cooling fluids, oils or air between the transmission output and the spindle.

This type of transmission normally includes a two stage planetary gear and a corresponding switching device, so that a rotational speed difference is developed between the motor shaft and the transmission output. For this reason, according to the invention, a dynamic sealing regulator is envisioned for the admission of the volume quantities and resulting pressures.

In the framework of a preferential execution form of the described invention, the sealed rotary feed-through is supported in the output shaft and includes two gaskets which serve as sealing regulators and as the admission device for the rotational speed difference. Depending on the medium, on the existing pressure and on the volumetric flow, the gaskets can be made of different materials and can have different geometries.

In accordance with a favorable development of the invention, the sealed rotary feed-through includes a spring that compresses the gaskets together, leading to little or no leakage in the gaskets if the medium pressure increases. If there is no medium flow, gasket wear can be minimized by moving the two gaskets away from each other with the help of a device such as another spring, for example.

According to the invention design, the sealing regulator is shifted outside of the transmission, resulting in the benefit that any allowed leaks can be led back directly into a tank. With a solution according to the state of the art, the sealing regulators must seal 100% since, otherwise, the transmission oil would be contaminated, for example with cooling fluid, leading to a malfunction of the transmission.

The invention is exemplified in a more detailed basis in the attached FIGURE, which shows a schematic cutaway view of a preferential configuration of the transmission in accordance with the described invention. Planetary gears as they are usually installed in a machine tool transmission, in particular in a spindle transmission, are well known by those skilled in the art, for example as in the Applicant's EP 1 169 582 B1. The spindle transmission shown in the FIGURE includes a planetary gear, which is also applicable in further types of transmissions which are considered the state of the art.

BRIEF DESCRIPTION OF THE DRAWING

The invention will now be described, by way of example, with reference to the accompanying drawing in which:

The sole FIGURE diagrammatically shows a schematic cutaway view of a preferential configuration of a spindle transmission.

DETAILED DESCRIPTION OF THE INVENTION

The FIGURE shows a spindle transmission 1, which includes a drive shaft 2, an output shaft 3 and a two stage planetary gear arranged in the force flow direction between the drive shaft 2 and the output shaft 3. The planetary gear features a sun gear 4 connected with the transmission shaft 2, an internal gear 5 mounted in an internal gear housing 6 and a planetary pinion cage 7 with planetary gear 8, connected with the drive shaft 2, which form the output of the planetary gear.

The switching unit of the transmission is formed by a solenoid 9, which actuates a shift fork 10 that can be relocated by an actuating shaft 11. The output shaft 3 is supported by bearings 13, 14 which are placed in a bearing housing 12 where it is connected with a spindle 15.

In accordance with the invention, a sealed rotary feed-through is integrated into the transmission 1, which serves as the fluid transfer device for the flow of cooling fluids, oil or air between the transmission output 3 and the spindle 15.

The sealed rotary feed-through 24 is supported in the output shaft 3 and includes two gaskets 16, 17 which serve as sealing regulators and as the take up mechanism for the rotational speed difference. Gasket 16 is hereby intended to be the gasket on the engine side and gasket 17 is intended to be the spindle side gasket.

According to the FIGURE, the engine side gasket 16 is connected by a tube 18, the sun gear 4 and a hub 19 with the engine shaft and/or drive shaft 2. The spindle side gasket 17 is directly placed in the spindle 15 or in an additional connecting part, for example in a clutch.

The housing of the sealed rotary feed-through must preferably be supported by one or multiple bearings similar to a bearing 20, which can be ball bearings, roller bearings, friction bearings or hydraulic bearings. As can be seen in the FIGURE, the sealed rotary feed-through is formed by a check valve 21, which prevents pipe 18 from running dry and the connection lines from being operated without pressure.

In the context of the configuration represented in the FIGURE, the sealed rotary feed-through includes a spring 22, which presses the gaskets 16, 17 together. In direct gear (1 to 1 ratio) there is no rotational speed difference present at the sealing regulator, however, the rotating gaskets 16, 17 must keep the same static sealing.

Since the configuration of the sealing regulators, according to this invention, allows for leaks outside of the transmission, at least one leakage return flow 23 to a tank must be provided.

REFERENCE NUMERALS 1 transmission
2 drive shaft, motor shaft
3 output shaft
4 sun gear
5 internal gear
6 internal gear housing
7 planetary pinion cage
8 planetary gear
9 solenoids
10 shift forks
11 actuating shafts
12 bearing housing
13 bearing
14 bearing
15 spindles
16 engine side gasket
17 spindle side gasket
18 pipes
19 hubs
20 bearing
21 check valves
22 springs
23 leakage return flow

The invention claimed is:

1. A machine tool transmission in which at least one of force and torque is transmitted from an output shaft (3) of the transmission (1) directly to a spindle (15) via a sealed rotary feed-through (24), the spindle (15) having a cooling fluid passage and co-axially surrounding one end of the output shaft (3), the sealed rotary feed-through (24) being located between the output shaft (3) and the spindle (15) and serving as a transfer device for facilitating flow of a cooling fluid between the transmission output shaft (3) and the spindle (15), the sealed rotary feed-through (24) including a first gasket (16), on an engine facing side of the sealed rotary feed-through, which faces an engine when the transmission is installed, and a second gasket (17), on a spindle facing side of the sealed rotary feed-through, which faces the spindle (15) when the machine tool transmission is installed, wherein the gasket (16), on the engine facing side of the sealed rotary feed-through (24), is connected via a tube (18) with the output shaft (3), and the gasket (17) on the spindle facing side of the sealed rotary feed-through (24) is directly located radially within one of the spindle (15) and a connection part.

2. The machine tool transmission according to claim 1, wherein the transmission includes a planetary gear and the first gasket (16) on the engine facing side of the sealed rotary feed-through is connected by the tube (18), a sun gear (4) and a hub (19) to the output shaft (2).

3. The machine tool transmission according to claim 1, wherein the sealed rotary feed-through is supported by a suspension (20) in a housing, and the suspension (20) including one of ball bearings, roller bearings, friction bearings and hydraulic bearings.

4. The machine tool transmission according to claim 1, wherein the sealed rotary feed-through (24) includes a check valve (21) which prevents the tube (18) from running dry and feeder lines from operating during a pressure-free condition.

5. The machine tool transmission according to claim 1, wherein the sealed rotary feed-through has a spring (22) which maintains the gasket (16), on the engine facing side of the sealed rotary feed-through (24), and the gasket (17), on the spindle facing side of the sealed rotary feed-through (24), pressed together.

6. The machine tool transmission according to claim 1, wherein the sealed rotary feed-through has a mechanism separate the gasket (16), on the engine facing side, of the sealed rotary feed-through (24), from the gasket (17), on the spindle facing side of the sealed rotary feed-through (24), when the cooling fluid is not flowing between the transmission output shaft (3) and the spindle (15).

7. The machine tool transmission according to claim 6, wherein the mechanism for separating the first gasket (16), on the engine facing side of the sealed rotary feed-through (24), from the second gasket (17), on the spindle facing side of the sealed rotary feed-through is a spring.

8. The machine tool transmission according to claim 1, wherein the sealed rotary feed-through (24) includes at least one leakage return flow (23) to a tank.

9. A machine tool transmission in which at least one of force and torque is transmitted from an output shaft (3) of the transmission (1) to a spindle (15) via a sealed rotary feed-through (24), the spindle (15) having a central cooling fluid passage and the output shaft (3) accommodating a central tube (18), the spindle (15) co-axially surrounding one end of the output shaft (3) and the sealed rotary feed-through (24) being located between the output shaft (3) and the spindle (15) so as to couple the central tube (18) with the central cooling fluid passage of the spindle (15) to facilitate flow of a cooling fluid between the transmission output shaft (3) and the spindle (15), the sealed rotary feed-through (24) includes a first gasket (16), on an engine facing side of the sealed rotary feed-through, which faces an engine when the transmission is installed, and a second gasket (17), on a spindle facing side of the sealed rotary feed-through, which faces the spindle (15) when the machine tool transmission is installed, wherein the gasket (16) on the engine facing side of the sealed rotary feed-through (24) is connected with the tube (18) accommodated by the output shaft (3), and the gasket (17) on the spindle facing side of the sealed rotary feed-through (24) is located radially within one of the spindle (15) and a connection part.

* * * * *